United States Patent
Shah (10) Patent No.: US 10,929,003 B1
(45) Date of Patent: Feb. 23, 2021

(54) CROSS-PLATFORM DRAG AND DROP USER EXPERIENCE

(71) Applicant: Microsoft Technology Licensing, LLC, Redmond, WA (US)

(72) Inventor: Shrey Nitin Shah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/593,097

(22) Filed: Oct. 4, 2019

Related U.S. Application Data (60) Provisional application No. 62/885,560, filed on Aug. 12, 2019.

(51) Int. Cl.
 *G06F 3/048* (2013.01)
 *G06F 3/0486* (2013.01)

(52) U.S. Cl.
 CPC ................. *G06F 3/0486* (2013.01)

(58) Field of Classification Search
 None
 See application file for complete search history.

(56) References Cited

U.S. PATENT DOCUMENTS

| 2006/0195791 A1* | 8/2006 | Johanson | G06F 3/0486 715/740 |
|---|---|---|---|
| 2009/0030971 A1 | 1/2009 | Trivedi et al. | |
| 2014/0016037 A1 | 1/2014 | Goldberg et al. | |
| 2015/0020013 A1 | 1/2015 | Kim et al. | |
| 2015/0054852 A1 | 2/2015 | Ohnuma et al. | |
| 2015/0082058 A1* | 3/2015 | Hahm | G06F 3/1454 713/320 |

OTHER PUBLICATIONS

"X Window System—Wikipedia", Retrieved From: https://en.wikipedia.org/w/index.php?title=X_Window_System&oldid=908373841, Jul. 29, 2019, 19 Pages.

"International Search Report and Written Opinion Issued in PCT Application No. PCT/US20/037097", dated Nov. 2, 2020, 13 Pages.

* cited by examiner

*Primary Examiner* — William C Trapanese (57) ABSTRACT

In non-limiting examples of the present disclosure, systems, methods and devices for assisting with cross-platform drag and drop functionality are provided. A mirroring application that mirrors a UI of a second device and partially overlaps a UI of a first device may be surfaced on the UI of the first device. A drag-initiating input of an object of the second device may be received. A drag input dragging the object over a boundary of the mirroring application may be received. A UI element corresponding to the object may be surfaced over the boundary. The object may be sent by the second device to the first device. A drop input may be received over a construct of the first computing device. The object may be translated to a format compatible with the construct, and the object may be saved to a location of the first device corresponding to the construct.

16 Claims, 10 Drawing Sheets

CROSS-PLATFORM DRAG AND DROP USER EXPERIENCE

RELATED APPLICATIONS

This application is related to and claims priority to U.S. Provisional Patent Application No. 62/885,560, filed Aug. 12, 2019, and entitled "CROSS-PLATFORM DRAG AND DROP USER EXPERIENCE," which is hereby incorporated by reference in its entirety.

BACKGROUND

Computing devices have become ubiquitous in most aspects of life. It is now common for users to be connected to at least one device at any given time, and sometimes even two or three devices at once. One of the reasons that computing devices have become so ubiquitous to everyday users is due to the number of options available to those users. For any given device type (e.g., phone, tablet, laptop, desktop) there are multiple device manufacturers with their own set of hardware configurations, in addition to unique operating system types and application suites that may be run on those devices. Thus, it is not uncommon for a user to have, and frequently use, a smart phone that operates on a first platform, a tablet that operates on a second platform, and one or more desktop and/or laptop computing devices that operate on one or more additional platforms.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for assisting with cross-platform drag and drop functionality. A common scenario related to multi-device use cases is the ability to "remote access" one device from another device and interact with the native experience (e.g., remote desktop or visual network computing). In examples, a user may link a host device with a remote device via a device mirroring application and a network (e.g., Bluetooth network, local area network, WiFi network, etc.). The remote device user interface may thus be mirrored on the host device, while allowing the user to interact with the remote device via the host device's native controls. According to examples described herein a user may perform a drag and drop operation that drags an object mirrored on the device mirroring application of the host device to a construct of the host device (e.g., an application, a desktop) where the object is dropped. The object may be copied from the remote device and transferred to the host device. In some examples, the object may be translated from its native format to one or more formats that are compatible with the host device and/or a construct of the host device where the object is dropped.

BRIEF DESCRIPTION OF THE DRAWINGS

Non-limiting and non-exhaustive examples are described with reference to the following figures.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for assisting with cross-platform drag and drop functionality utilizing a platform mirroring application. As used herein, "platform" describes a specific environment comprised of a set of computer hardware and an operating system on which software is executed. For example, a first computing device may be said to run on a first platform that is different than a second platform if it has a unique set of one or both of: hardware components and/or an operating system (including an operating system version), and a second computing device may be said to run on a second platform that is different from the first platform if it has a set of one or both of: hardware components and/or an operating system (including an operating system version), that is different than the first computing device.

A "host device" as described herein is a device that a user may control and/or view a copy, in real or near real-time, of a user interface of a "remote device". A "remote device" as described herein is a device that may have its user interface copied, in real or near real-time, on a device mirroring application of a host device. The remote device may be controlled via the native controls of the host device via the device mirroring application.

According to examples, a host device and a remote device may each run a device mirroring application. The mirroring application may run in the background of the remote device, while a window mirroring the user interface of the remote device may be displayed on a user interface of the host device. The remote device and the host device may connect with one another (e.g., via Bluetooth, via network connection, via Wi-Fi, etc.). A user may initiate a drag and drop operation via the host device and the mirroring application. For example, a user may left click, touch and hold, etc. on an object in the device mirroring application. In some examples, the object may be currently displayed on the user interface of the remote device. In other examples, the display of the remote device may be non-active or in an off state, but the object would be displayed if the display were transitioned to an active, or on, state. This "start" of a drag and drop operation is described herein as a "drag-initiating input". When the drag initiating input is received at the mirroring application on the host device, an indication of that input may be sent by the host device to the remote device. The remote device may then copy the object corresponding to the object element that the drag input was received in relation to on the host device and save that object to a temporary storage location on the remote device. In some examples, the temporary storage location may comprise an electronic clipboard. In other examples, the object may be made available for transfer to the host device and/or saved to other storage locations (e.g., via a user interface accessibility tree, via an application-specific API, via a clipboard manager application, etc.).

As the object element is being dragged/moved across the device mirroring application on the host device, the remote device may receive an indication of that movement from the host device and move the display of its corresponding object in relation to that movement in real time or near real time. When the object element in the device mirroring application reaches the border of the device mirroring application and the native constructs of the host device, an indication of that border being reached may be sent from the host device to the remote device. The remote device may transfer the copied object in temporary storage to the host device. The host device may store the copied object in its own temporary storage location. In examples, the temporary storage location on the host device may comprise an electronic clipboard. In other examples, the object may be stored in a different temporary storage location (e.g., a temporary storage location associated with a clipboard manger application, a temporary storage location associated with a different application, etc.). When the drag operation being performed on the host device causes the object element to cross the border between the device mirroring application and the native constructs of the host device, the object may be caused to be surfaced on the native constructs of the host device, while disappearing from the device mirroring application. An indication that the object element has moved over into the host device's native constructs may be sent to the remote device, and the remote device may then no longer display all of the corresponding object and/or the portion of the corresponding object that has crossed the border between the device mirroring application and the native constructs of the host device.

A translation engine associated with the host device may determine whether the object copied to temporary storage on the host device is in a format that is compatible with the host device and/or a construct that the object is being dropped into. If the object is in a format that is compatible with the host device, no translation may be necessary, and the object may be dropped into the construct of the host device in the format it was received by the host device in. If the object is not in a format that is compatible with the host device, the translation engine may translate the object into one or more formats that are compatible with the host device. In additional examples, the translation engine may identify a secondary source location of an object corresponding to the object element that is being dropped (e.g., if the translation engine is incapable of translating the object into a compatible format; if network conditions are poor; depending on a size of the object). When the object is dropped in the host device construct, the translation engine and/or the device mirroring application may convert the user interface element corresponding to the object into a link or shortcut where the object can be located at the secondary source. When a drop command (e.g., release of left click, removal of touch input in relation to object element) is received at the host device over the host device's native construct (e.g., over an application or shell construct), the object may be inserted, embedded and/or saved to the location where the drop command was received. In some examples, the object may be deleted from the remote device. In other examples, the object may be retained at the remote device.

The systems, methods, and devices described herein provide technical advantages for transferring objects across computing devices operating on different platforms. Processing costs (i.e., CPU cycles) associated with transferring objects from a remote device operating on a first platform to a host device operating on a second platform are reduced in that an object does not need to be manually converted to a compatible file type for reading by the host device. Rather, a translation engine may identify compatible format types across devices and applications and automatically translate an object from a first, non-compatible format, to one or more compatible formats. Additionally, rather than requiring that an object from a remote device be copied to a removable storage device (e.g., a USB drive) and physically transferred via that removable storage device, the current mechanisms allow for object transfer interactions across different platforms via wireless communication and a drag and drop mechanism that is familiar to users. Further, whereas most solutions related to cross platform object transfers only provide for limited data payload types to be transferred (e.g. limited image types, plain text), the mechanisms described herein may be applied to a vast number of payload types due to the utilization of a translation engine. Additionally, the mechanisms described herein provide for a more secure transfer of objects across different platforms, as objects may be transferred directly from a first platform device to a second platform device, whereas even limited payload solutions in the field had traditionally required that an object be saved to the cloud.

Figure 1:
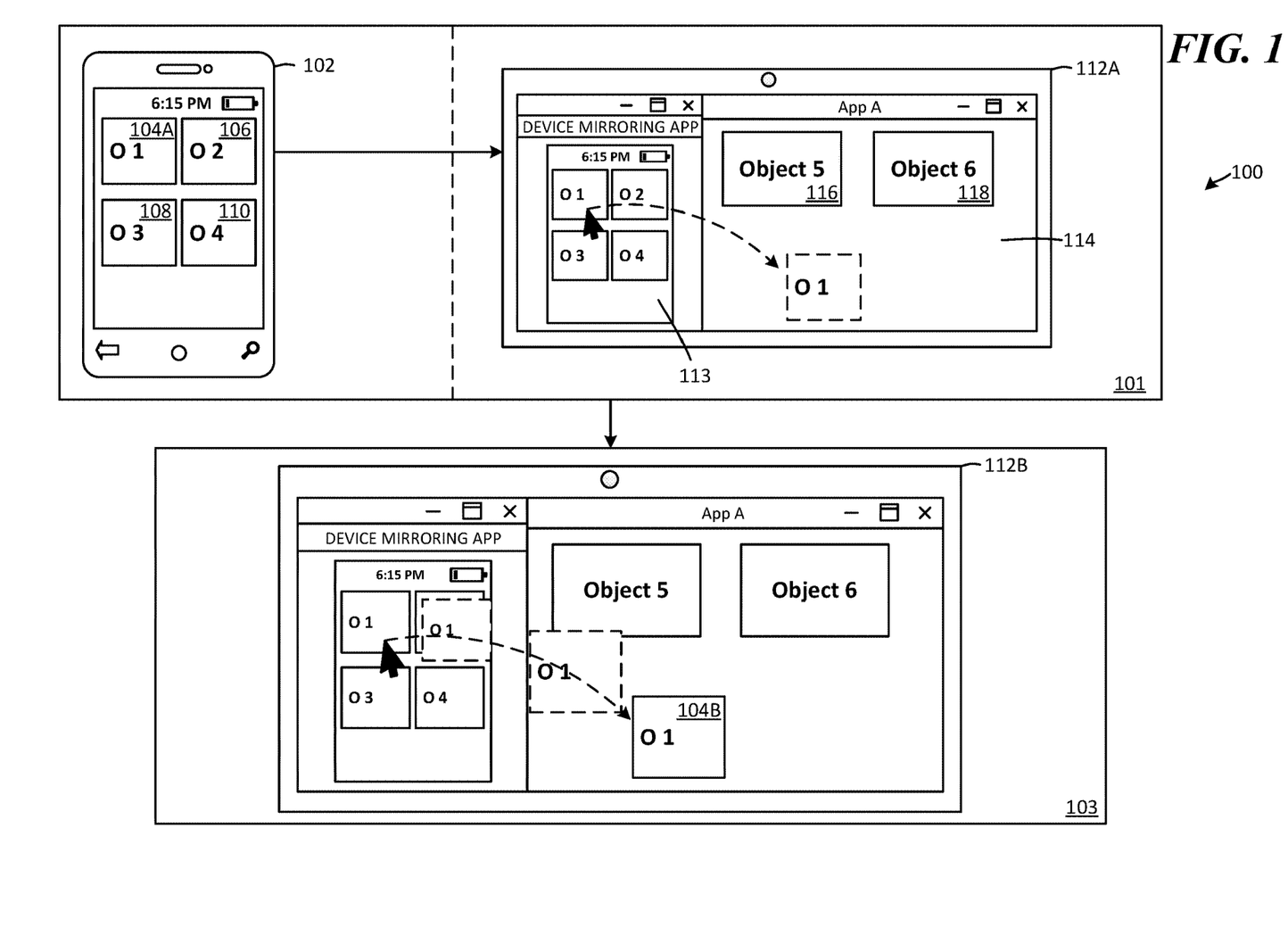
FIG. 1 is a schematic diagram illustrating an example distributed computing environment for assisting with cross-platform drag and drop functionality utilizing a platform mirroring application.

FIG. 1 is a schematic diagram illustrating an example distributed computing environment 100 for assisting with cross-platform drag and drop functionality utilizing a platform mirroring application. Computing device 100 includes first drag and drop sub-environment 101 and second drag and drop sub-environment 103. First drag and drop sub-environment 101 includes remote computing device 102 and host computing device 112A. Remote computing device 102 runs on a first platform and host computing device 112A runs on a second platform that is different from the first platform. Second drag and drop sub environment 103 includes host computing device 112B, which is the same device as host computing device 112B after a drag and drop operation has been completed.

Remote computing device 102 and host computing device 112A may establish a connection with one another. The connection may be a network connection, a Bluetooth connection, a Wi-Fi connection, a local area network connection, etc. In some examples, the connection may be encrypted. Remote computing device 102 and host computing device 112A are each executing a device mirroring application. The device mirroring application provides mechanisms for mirroring, in real time or near real time, the user interface of remote computing device 102 on the user interface of host computing device 112A. Various operations may be performed in the constructs of the device mirroring application on host computing device 102 to control and/or interact with operations and content on remote computing device 112A. The device mirroring application is illustrated on computing device 112A at device mirroring application window 113. The device mirroring application may run in the "background" of remote computing device 102. That is, there need not be an application window open on remote computing device 102 for it to perform one or more of the operations described herein.

Remote computing device 102 displays a plurality of objects on its user interface. Those objects are object 1 104A object 2 106, object 3 108 and object 4 110. That user interface is mirrored on device mirroring application window 113 on the user interface of host computing device 112A via the connection between the two devices. Mirroring application window 113 is positioned adjacent to and/or partially overlapping native application window 114 on host computing device 112A. Native application window 114 displays an open application (Application A) that is native to host computing device 112A. There are two objects displayed by Application A—object 5 116 and object 6 118.

In some examples, a user may want to move one or more objects (e.g., file objects, folder objects, application objects, document objects, image objects, video objects) from remote computing device 102 to host computing device 112A, or from host computing device 112A to remote computing device 102. One of the most user-friendly means for accomplishing the movement and/or transition of objects from a first location to a second location on a computing device is the drag and drop interaction whereby an object is selected, a user interface element corresponding to the object is dragged to a location where the user would like to save and/or embed the object (e.g., in a desktop shell construct, in a file browsing shell construct, in an application construct), the user interface element corresponding to the object is unselected (i.e., "dropped"), that user interface element is converted to a shortcut to the object in that new location (or the object is directly embedded in an application), and the object file is saved to a location corresponding to the drop. However, remote computing device 102 and host computing device 112A may run different operating systems, which may not have one-to-one file navigation and/or execution compatibility. Additionally, one or more constructs that an object may be dragged to on host computing device 112A may not support the object type of an object from remote computing device 102.

The systems, methods and devices described herein provide mechanisms for overcoming the hurdles described above with regard to cross-platform drag and drop experiences. In the illustrated example, a user initiates, via a drag-initiating input, a drag and drop action of object 1 104A from device mirroring application window 113. As described herein, a drag-initiating input may comprise one or more of: a left click and hold on an object, a selection of an object and subsequent movement of the object, a touch and hold on an object, and/or a verbal command to initiate a drag of an object, for example. A user interface element corresponding to object 1 104A is then moved/dragged from device mirroring application window 113 to Application A as illustrated by object 1 104B in second drag and drop sub-environment 103. When the user interface element corresponding to object 1 104B is dropped (e.g., the left click is released, the touch and hold is removed from the display of computing device 112B), object 1 104B is embedded directly into Application A along with object 5 and object 6, object 1 104B is saved to a location corresponding to the file open in Application A where object 1 104B was dropped, and/or a user interface element corresponding to object 1 104B is embedded into Application A which is converted to a shortcut to a file corresponding to object 1 104B. Specific mechanisms by which these operations are accomplished are more fully discussed in relation to FIGS. 2-4 below.

Figure 2:
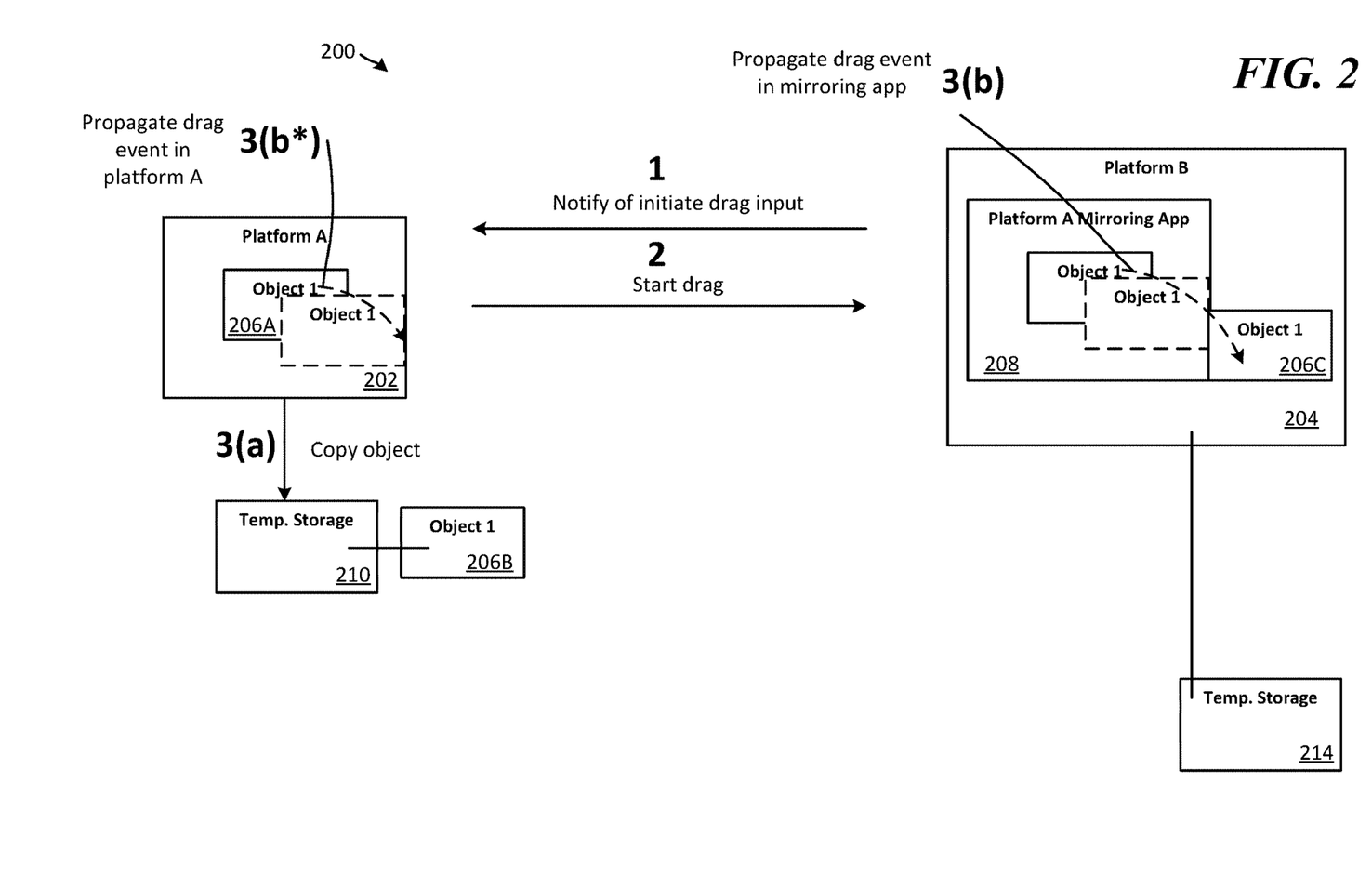
FIG. 2 is a schematic diagram illustrating an example distributed computing environment for assisting with cross-platform drag and drop functionality, starting with a drag-initiating input and continuing through a drag in a platform mirroring application.
Figure 3:
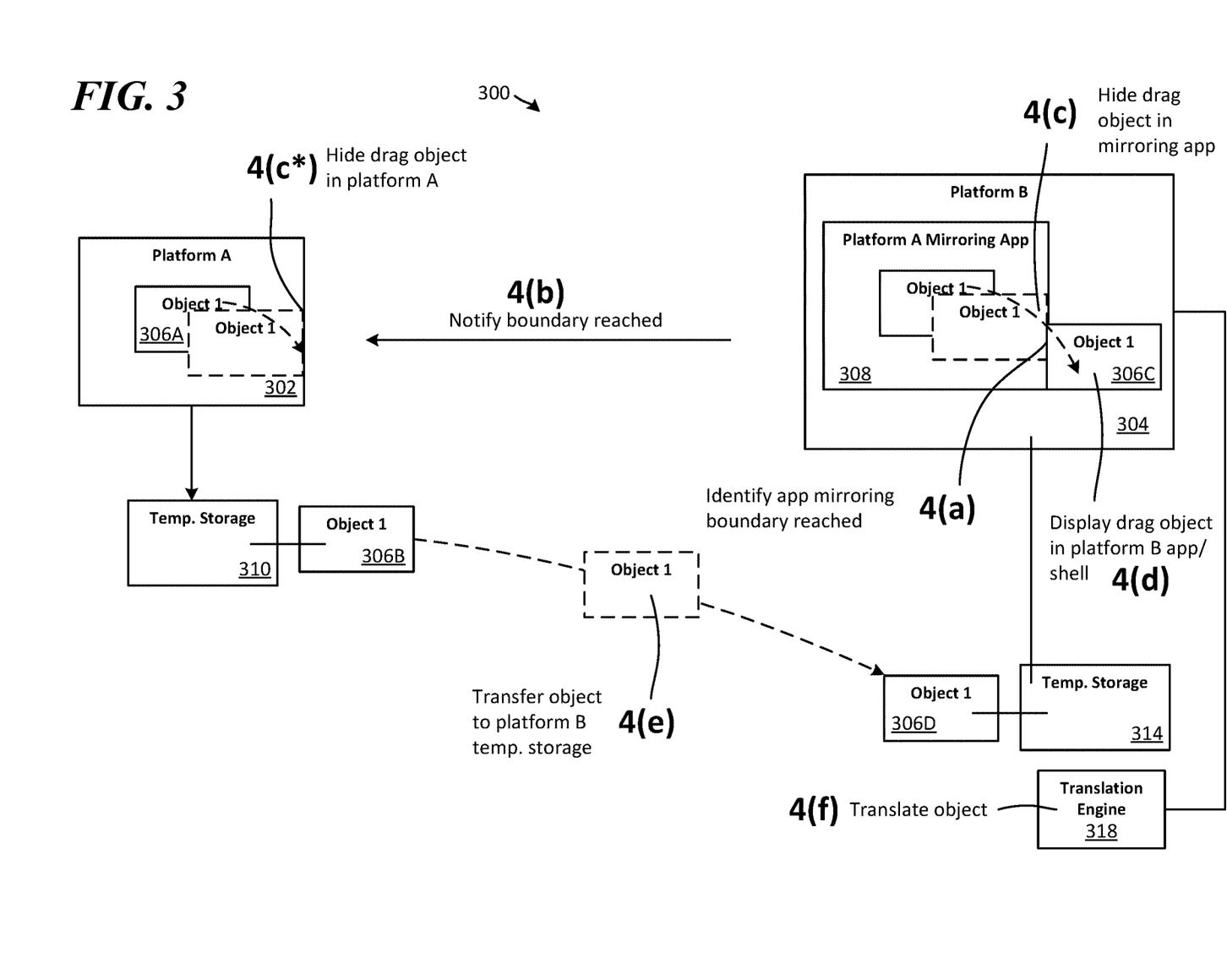
FIG. 3 is a schematic diagram illustrating an example distributed computing environment for assisting with cross-platform drag and drop functionality, starting from an object UI element being dragged through a platform mirroring application boundary between the mirroring application and a native application and/or shell construct.
Figure 4:
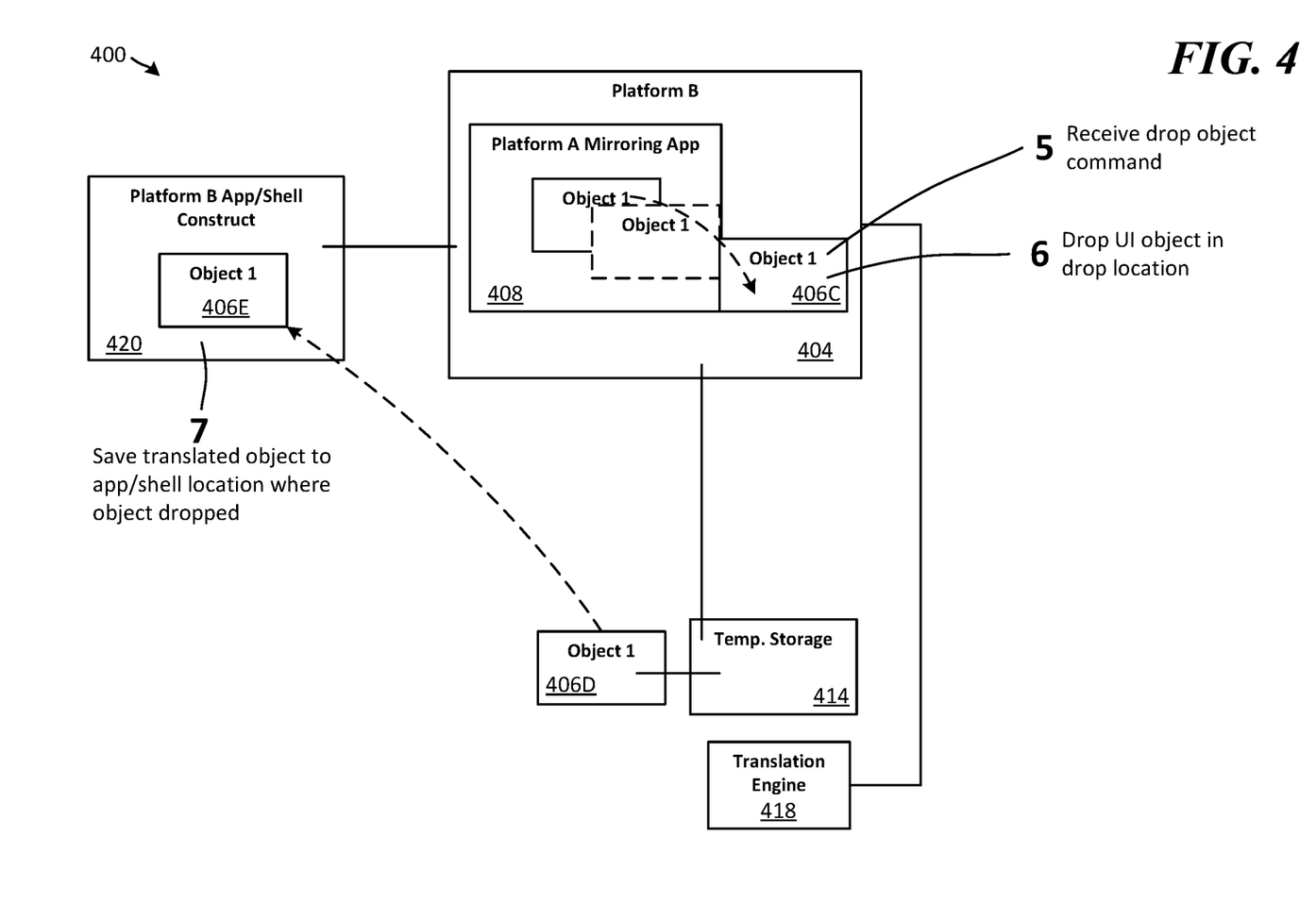
FIG. 4 is a schematic diagram illustrating an example distributed computing environment for assisting with cross-platform drag and drop functionality, starting from a drop object command in the native constructs of a computing device and continuing through the saving of that object to the computing device.

FIG. 2 is a schematic diagram illustrating an example distributed computing environment 200 for assisting with cross-platform drag and drop functionality, starting with a drag-initiating input and continuing through a drag in a platform mirroring application. FIG. 2, FIG. 3 and FIG. 4 include drag and drop element numbers (e.g., 1, 2, 3(*a*), 3(*b*)). The drag and drop element numbers are provided for ease of illustration, but it should be understood that the operations associated with those element numbers may be, but are not necessarily, performed in the numbered and/or lettered order.

Distributed computing environment 200 includes platform A 202, which is representative of a first computing device that operates on a first computing platform, and platform B, which operates on a second computing platform that is different than the first computing platform. Platform A includes an object (Object 1 206A) on its user interface. Platform A 202 also includes temporary storage 210, which may be utilized to temporarily store data associated with (e.g., generated by, downloaded by, received by, sent by, copied by) platform A 202. Platform A also includes (although not shown) a platform mirroring application that may be running in the background and performing one or more of the operations described herein. Platform B includes platform A mirroring application 208. Platform A and platform B are communicatively connected (e.g., via Bluetooth, via network connection, via Wi-Fi). In some examples, platform A 202 may transfer, via its platform mirroring application, an indication of content that is being currently displayed on the user interface of platform A 202. In other examples, if platform A 202 is in a non-active, or off, state, platform A 202 may transfer, via its platform mirroring application, an indication of content that would be currently displayed on the user interface of platform A 202 if it was in an active, or on, state. That information may be received by platform A mirroring application 208, which may then cause platform B 204 to display a mirrored copy of the user interface (or if in a non-active state, what the user interface would appear like if in an active state) of platform A in a window corresponding to platform A mirroring application 208. Thus, platform B 204 displays object 1 206C in platform A mirroring application 208.

In this example, a user initiates a drag and drop of object 1 206C from platform B 204, and specifically, from platform A mirroring application 208. The user may initiate the drag of object 1 206C via various mechanisms (e.g., a left mouse click and hold on the object, a touch and hold on the object, a touch hold and move on the object). An indication that this "triggering event", herein referred to as a drag-initiating input, is sent from platform B to Platform A as indicated by drag and drop element 1. Platform A receives that indication, and copies object 1 206A to temporary storage 210, as illustrated by object 1 206B and by drag and drop element 3(*a*). When object 1 206C is moved/dragged in association with the drag-initiating input (as illustrated by drag and drop element 3(*b*)), platform A receives that indication from platform B, and the user interface element corresponding to object 1 206A is moved on the user interface of platform A in accordance with that movement/dragging, as illustrated by drag and drop element 3(*b). In some examples, the user interface element corresponding to an object that is being dragged may be highlighted, shadowed, and/or otherwise indicated as being in a drag state while the drag event is occurring. Additional details regarding a drag and drop flow according to the aspects described herein are provided in relation to FIG. 3**.

FIG. 3 is a schematic diagram illustrating an example distributed computing environment 300 for assisting with cross-platform drag and drop functionality, starting from an object UI element being dragged through a platform mirroring application boundary between the mirroring application and a native application and/or shell construct. In this example, the drag of object 1 306C has begun and object 1 306C has met a boundary of the platform A mirroring application 308, as illustrated by drag and drop element 4(*a*). Platform B 304 then sends an indication to platform A 302 that object 1 306C has reached the boundary of platform A mirroring application 308, as illustrated by drag and drop element 4(*b*). Any portion of object 1 306C that crosses that boundary may be caused to be hidden on the user interface of platform A, as indicated by drag and drop element 4(*c*). Additionally, any portion of object 1 306C that crosses that boundary over into the native constructs of platform B 304 (e.g., a native application, a desktop, a file browsing construct) may be caused to be displayed as being overlaid those constructs, as illustrated by drag and drop element 4(*d*). Thus, in some examples, a portion of object 1 306C may be displayed in platform A mirroring application 308 while a portion over the boundary may be displayed in the native constructs of platform B 304. Alternatively, in some examples, once object 1 306C crosses the boundary, the entirety of object 1 306C may be caused to be displayed in the native constructs of platform B 304 and removed from the display on platform A mirroring application 308. When platform A receives an indication that object 1 306C has met and/or gone over the boundary between platform A mirroring application 308 and the native constructs of platform B 304, object 1 306B in temporary storage 310 may be sent to temporary storage 314 of platform B, as indicated by object 1 306D in temporary storage 314, and illustrated by drag and drop element 4(*e*).

In some examples, object 1 306D may be stored in a format that is not compatible with the construct it is being dragged to in platform B 304 (e.g., an application construct, a shell construct). For example, if object 1 306C is being dragged over a word processing application that is native to platform B, and object 1 306D is a word processing document that is in a format that is native to platform A, platform B may not be capable of reading/editing object 1 306D in its current format. One or more operations associated with translation engine 318 executed by platform B may be applied to object 1 306D. Translation engine 318 may perform operations associated with identifying one or more formats of an object, determining one or more formats that are readable/executable by a target application (i.e., an application where an object is being dropped), and translating an object into one or more formats that are compatible with a target application. In additional examples, if translation engine 318 cannot identify a compatible format that it is capable of translating an object into, translation engine 318 may identify a corresponding object from a secondary source (e.g., an app store, an cloud storage platform, a web application, etc.) and provide a shortcut and/or link to that source. In this example, translation engine 318 is capable of translating object 1 306D to a format that is compatible with the construct that object 1 306C is being dragged over/into in platform B. As such, translation engine 318 translates object 1 306D into that format, as illustrated by drag and drop element 4(*f*). In some examples, translation engine 318 may translate the object into one or more compatible formats. Additional details regarding a drag and drop flow according to the aspects described herein are provided in relation to FIG. 4.

FIG. 4 is a schematic diagram illustrating an example distributed computing environment 400 for assisting with cross-platform drag and drop functionality, starting from a drop object command in the native constructs of a computing device and continuing through the saving of that object to the computing device. In this example, object 1 406D has been translated by translation engine 418 into a format that is compatible with the construct it has been dragged into in platform B 404. Object 1 406C is dropped in that native construct of platform B (e.g., it is dropped in an application or shell construct of platform B), as illustrated by drag and drop elements 5 and 6. In some examples, the object may not be translated until the drop command has been received. In other examples, the object may be translated prior to the drop command being received. The drop command may be a release of a mouse click, a removal of a touch on the display of the device of platform B, etc. Object 1 406D may then be embedded into the construct of platform B 404 where it was dropped. In some examples, a user interface element corresponding to the object may be converted to a shortcut to the object file and inserted at the location where the drop command was received. In additional examples, the object may be saved to a location corresponding to the location where the drop command was received, as indicated by object 1 406E in platform B application/shell construct 420, and as illustrated by drag and drop element 7. In some examples, the object that was dropped in platform B may be deleted from platform A. In other examples, the object that was dropped in platform B may be retained by platform A.

Figure 5A:
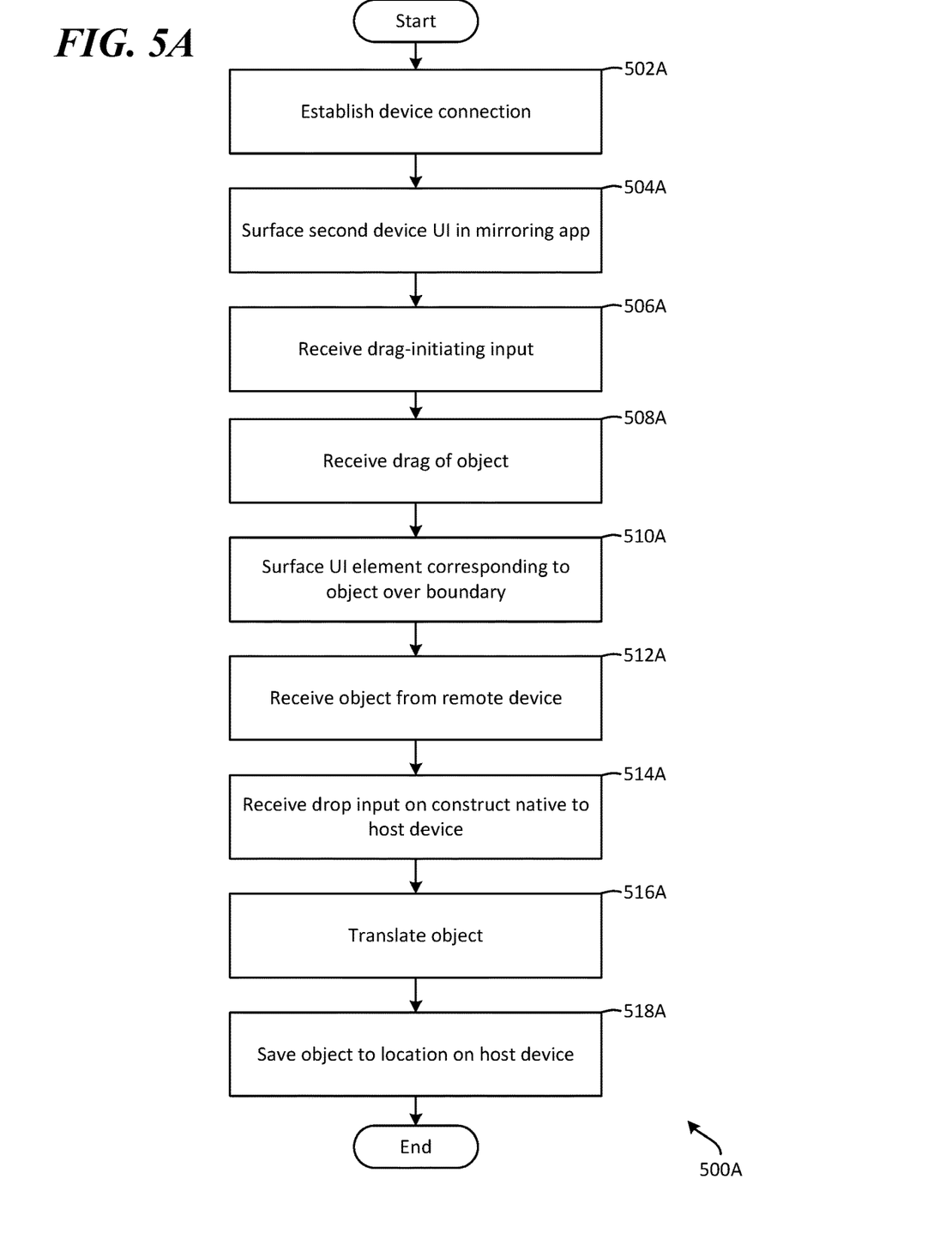
FIG. 5A is an exemplary method for assisting with cross-platform drag and drop functionality from the host computing device.

FIG. 5A is an exemplary method 500A for assisting with cross-platform drag and drop functionality from the host computing device. The method 500A begins at a start operation and flow continues to operation 502A where a connection with a second device is established by a first device. In this example, the first device is the host device and the second device is the remote device. In some examples, the connection may be automatically established based on a same user account be signed into a device mirroring application that is running on the first device and a device mirroring application that is running on the second device. In additional examples, the connection may be established via a network setting associated with the user account. The connection may be one of: a WiFi connection, a Bluetooth connection, a LAN connection, etc.

From operation 502A flow continues to operation 504A where a mirroring application that mirrors the user interface of the second device and partially overlaps the user interface of the first device is surfaced on a user interface of the first device. In examples where the first device is connected to one or more external and/or secondary display devices the mirroring application may be surfaced on one of the external and/or secondary display devices. In some examples, the user interface of the second device may be in an active, or on, display state when it is mirrored by the first device. In other examples, the user interface of the second device may be in an inactive, or off, display state when it is mirrored by the first device.

From operation 504A flow continues to operation 506A where a drag-initiating input of a user interface element corresponding to an object of the second device is received. The drag-initiating input may comprise one or more of: a left click and hold on an object, a selection of an object and subsequent movement of the object, a touch and hold on an object, and/or a verbal command to initiate a drag of an object, for example. In some examples, the drag-initiating input may initiate the copying of the object to temporary storage by the remote device. A temporary storage location where the object is copied to may be a clipboard, an application-specific storage location, a cloud location, or another temporary storage location, for example.

From operation 506A flow continues to operation 508A where a drag input dragging the user interface element corresponding to the object over a boundary of the mirroring application is received. The drag input may comprise one or more of: a mouse movement in association with an interacted-with object, and a non-interrupted touch input and movement on a touch-enabled display in association with an interacted-object, for example.

From operation 508A flow continues to operation 510A where a second user interface element corresponding to the object is surfaced at a location of the user interface of the first device (or display device connected to the first device) corresponding to a location where the drag input crossed the boundary of the mirroring application.

From operation 510A flow continues to operation 512A where the object is received by the host device from the remote device.

From operation 512A flow continues to operation 514A where a drop input of the user interface element is received on a construct displayed on the user interface of the first device. The object may be dropped into an application construct or an operating shell construct of the host device. The drop input may comprise one of: a release of a mouse click, a release of a touch input from a display device, a voice instruction, etc.

From operation 514A flow continues to operation 516A where the object is translated to a format that is compatible with the construct. That is, in some examples, the object may be stored on the second device in a format that is not compatible with a construct where the object is being dropped on the first device. A translation engine that resides on one or both of the remote and/or host devices, and/or a device in the cloud (e.g., a server device), may translate the object to a compatible format. The translation may comprise converting the object to a different file type, adding file features to the object that are readable by both devices and/or different platforms, etc.

From operation 516A flow continues to operation 518A where the object is saved to a location of the first device corresponding to the construct. The object may be saved in a translated format.

From operation 518 flow moves to an end operation and the method 500A ends.

Figure 5B:
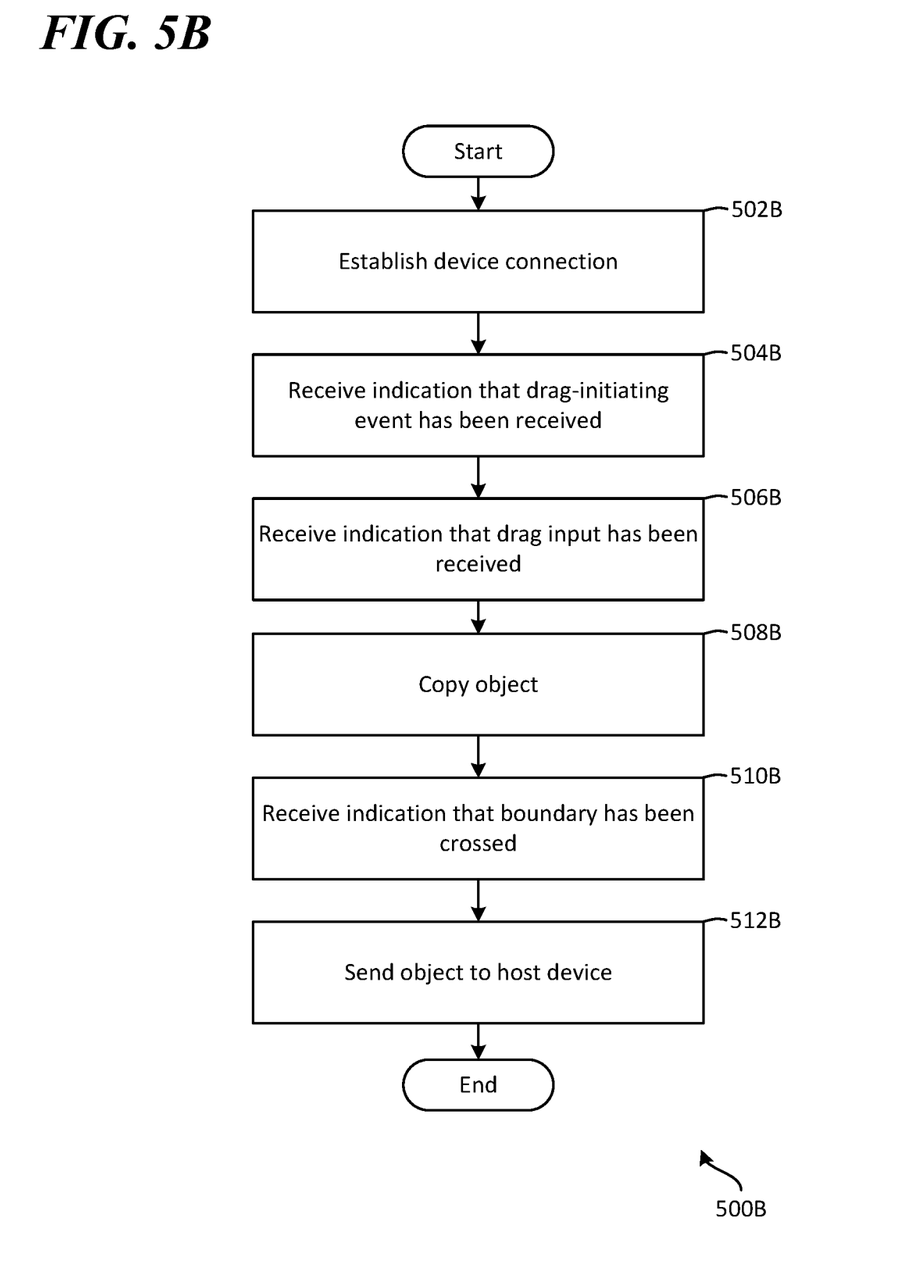
FIG. 5B is an exemplary method for assisting with cross-platform drag and drop functionality from the remote computing device.

FIG. 5B is an exemplary method 500B for assisting with cross-platform drag and drop functionality from the remote computing device. The method 500B begins at a start operation and flow continues to operation 502B where a connection between a first device and a second device is established. In this example, the first device is the host device and the second device is the remote device.

From operation 502B flow continues to operation 504B where an indication that a drag-initiating event of a user interface element corresponding to an object on the second device has been received by a mirroring application of the first device is received by the second device.

From operation 504B flow continues to operation 506B where an indication that a drag input of the user interface element corresponding to the object has been received by the mirroring application of the first device is received by the second device.

From operation 506B flow continues to operation 508B where the object is copied by the second device.

From operation 508B flow continues to operation 510B where an indication that the user interface element corresponding to the object has crossed a boundary separating the mirroring application on the first device and a native construct on the user interface of the first device during the drag input is received.

From operation 510B flow continues to operation 512B where the object is sent from the second device to the first device.

From operation 512B flow moves to an end operation and the method 500B ends.

Figure 6:
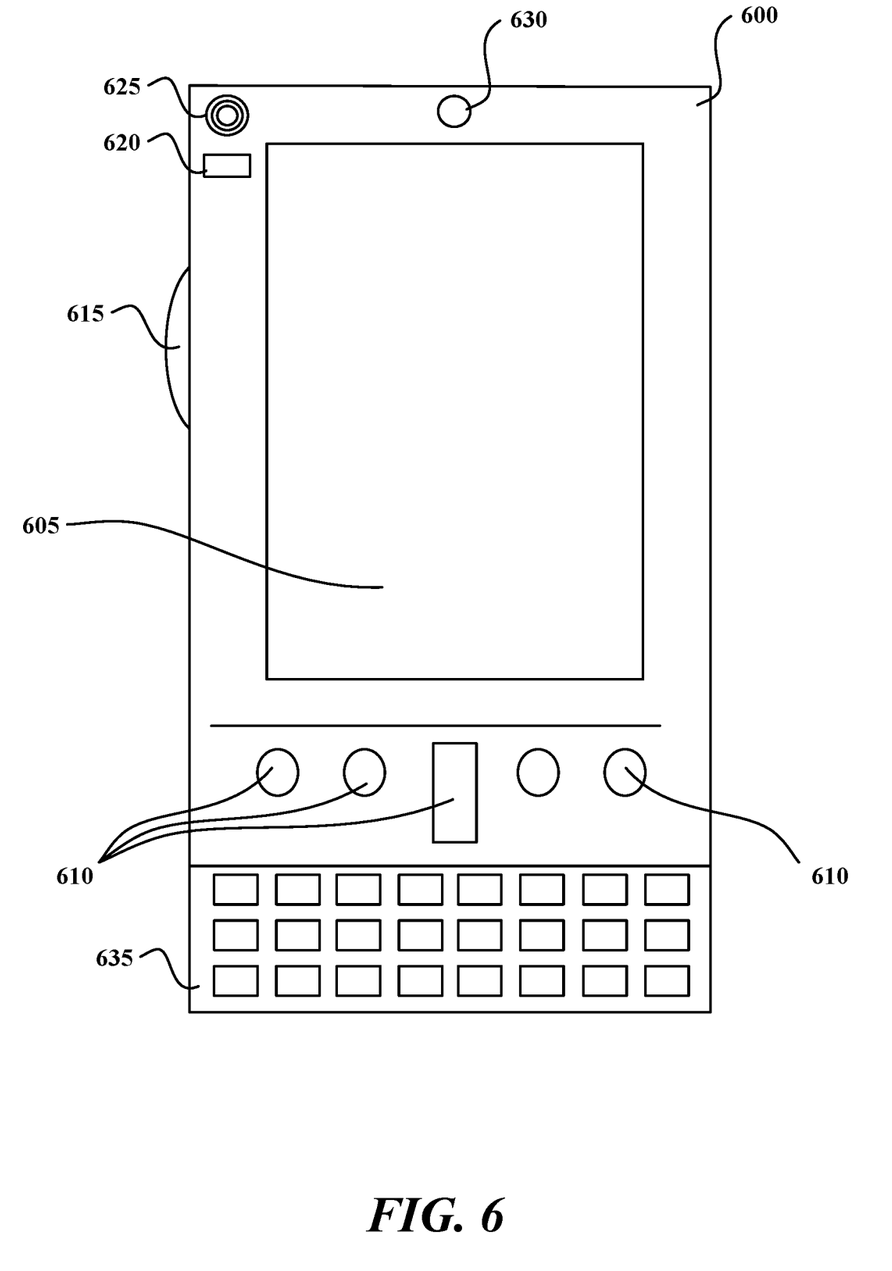
FIGS. 6 and 7 are simplified diagrams of a mobile computing device with which aspects of the disclosure may be practiced.
Figure 7:
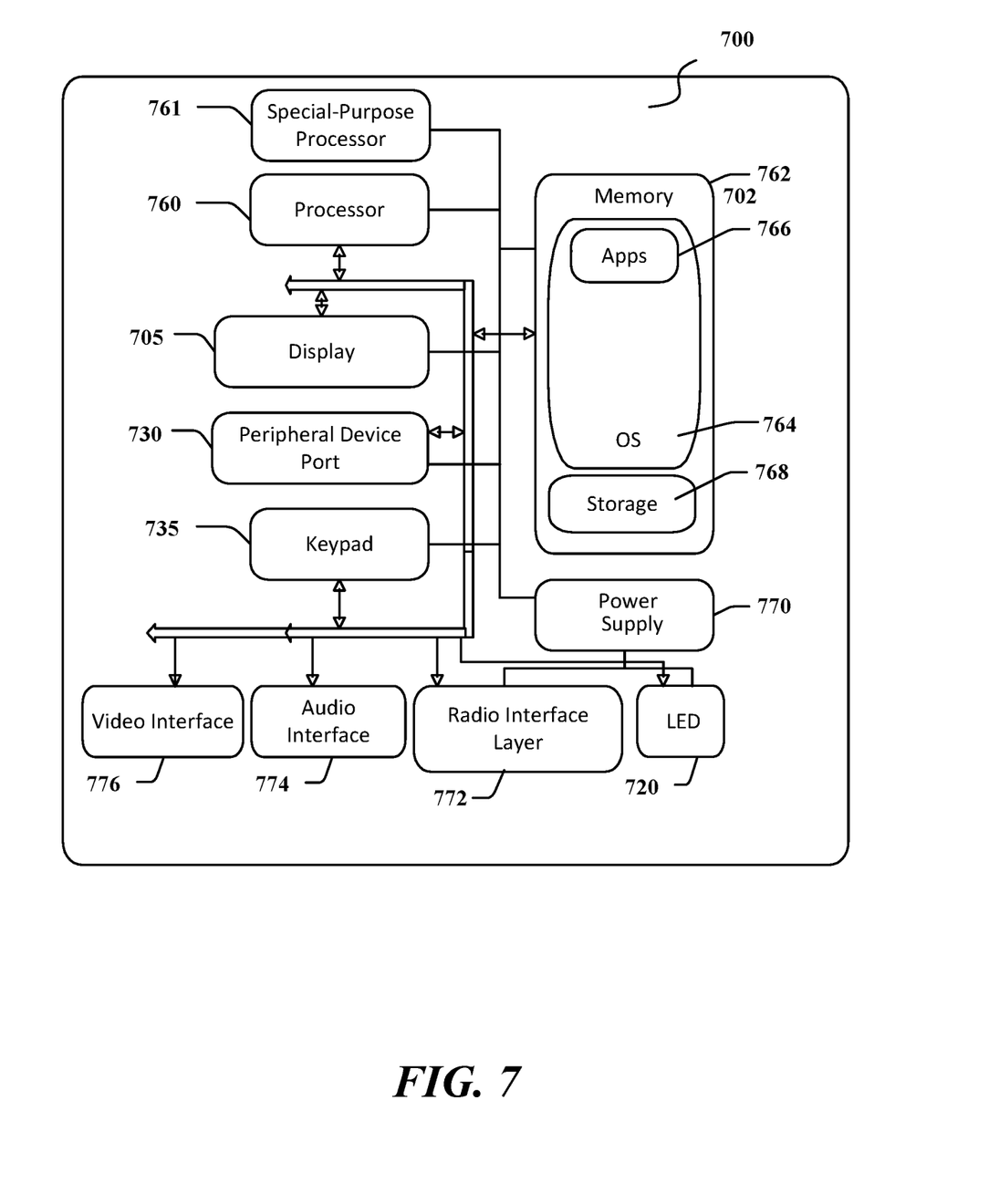

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a user experience transformation computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
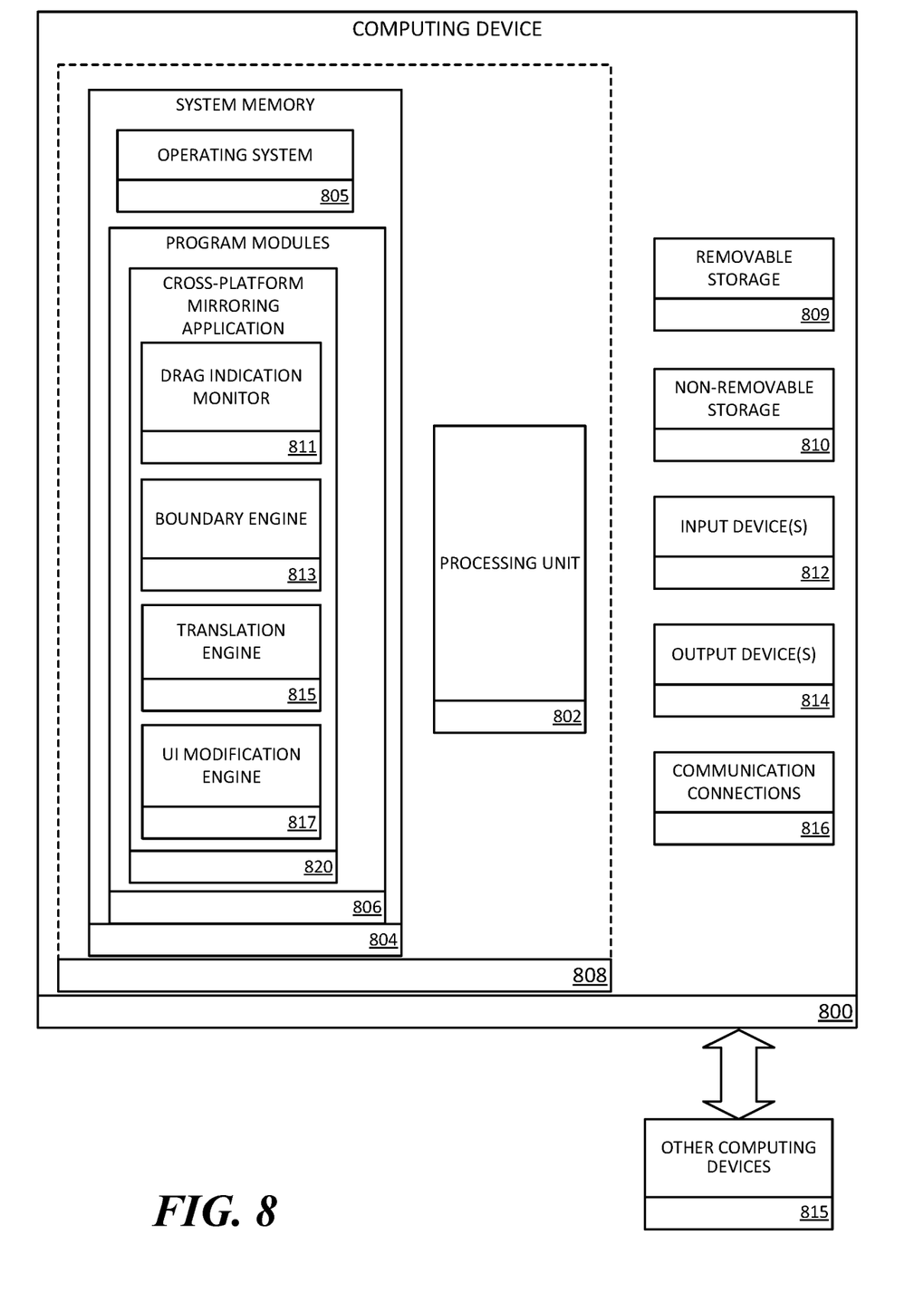
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with the dragging and dropping of objects across the constructs of devices operating on different platforms via a device mirroring application. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more cross-platform mirroring applications. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., cross-platform mirroring application 820) may perform processes including, but not limited to, the aspects, as described herein. According to examples, drag indication monitor 811 may perform one or more operations associated with identifying when a drag-initiating command has been received in relation to an object element displayed in a device mirroring application of a host device. Boundary engine 813 may perform one or more operations associated with identifying when an object element has reached a boundary of a device mirroring application and the native constructs of a host device. Translation engine 815 may perform one or more operations associated with identifying whether an object received from a remote device is compatible with a host device, translating the object into one or more compatible formats with the host device if the format the object was received in is not compatible with the host device. UI modification engine 817 may perform one or more operations associated with modifying an object element displayed in a device mirroring application to a format that is native across the boundary of a host device.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
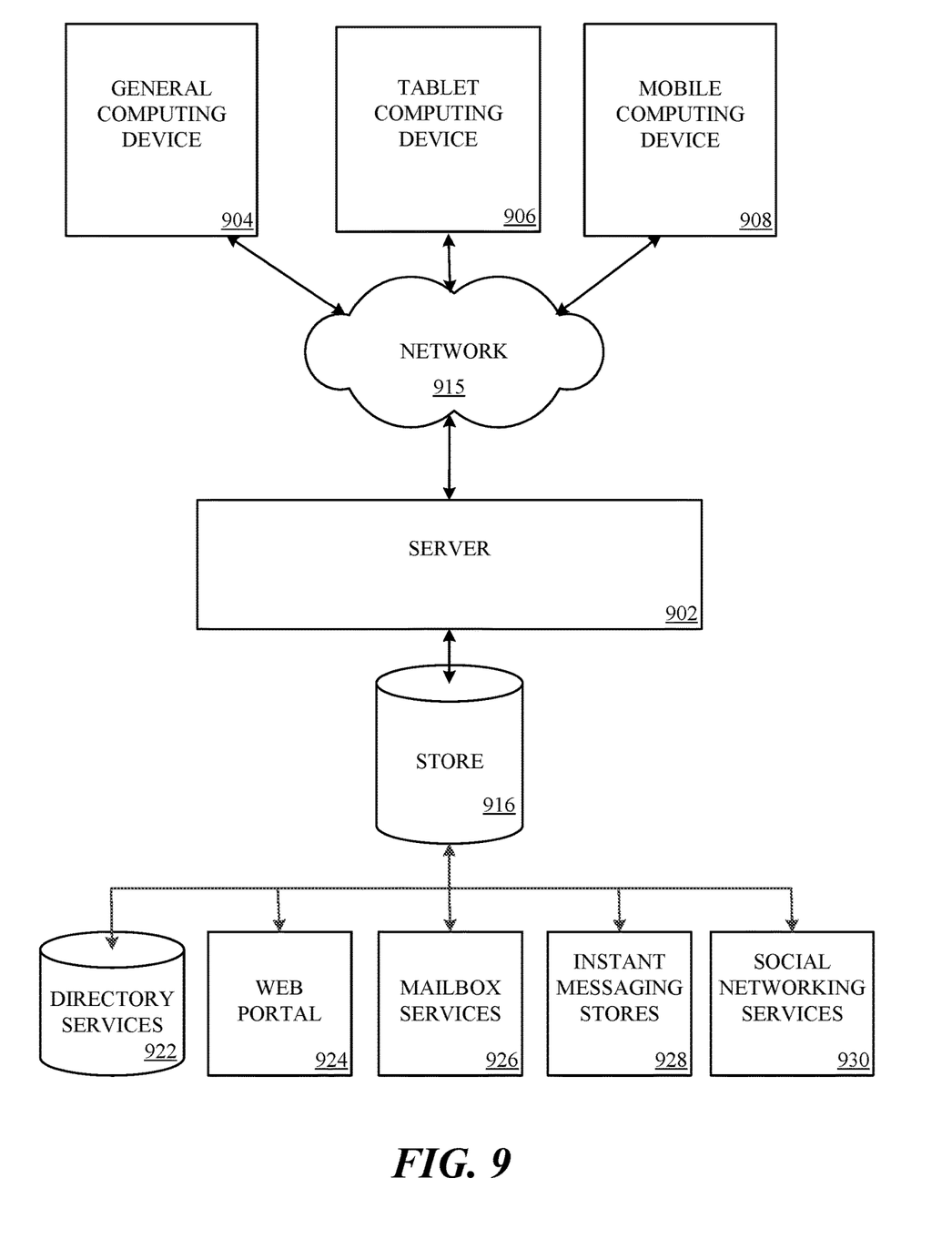
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way.

The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for assisting with cross-platform drag and drop functionality, the computer-implemented method comprising:
    surfacing, on a user interface of a first device, a mirroring application that mirrors a user interface of a second device and partially overlaps the user interface of the first device;
    receiving a drag-initiating input of a user interface element corresponding to an object of the second device;
    saving, based on receiving the drag-initiating input, the object to a temporary storage location of the second device;
    receiving a drag input dragging the user interface element corresponding to the object over a boundary of the mirroring application;
    surfacing a second user interface element corresponding to the object at a location of the user interface of the first device corresponding to a location where the drag input crossed the boundary of the mirroring application;
    saving, based on the drag input crossing the boundary of the mirroring application, the object to a temporary storage location of the first device;
    receiving a drop input of the user interface element on a construct displayed on the user interface of the first device;
    translating the object to a format compatible with the construct; and
    saving the object to a location of the first device corresponding to the construct.

2. The computer-implemented method of claim 1, wherein the first device operates on a first platform, and the second device operates on a second platform.

3. The computer-implemented method of claim 1, wherein the drag-initiating input is initially received at the minoring application.

4. The computer-implemented method of claim 1, wherein the drag-initiating input is initially received at the second device.

5. The computer-implemented method of claim 1, wherein the construct is an application executed by the first device.

6. The computer-implemented method of claim 1, wherein the construct is a shell construct of the first platform device.

7. The computer-implemented method of claim 1, further comprising:
    determining whether the object of the second device is in a format that is executable by the construct displayed on the user interface of the first device where the drop input is received.

8. A computer-implemented method for assisting with cross-platform drag and drop functionality, the computer-implemented method comprising:
    receiving an indication that a drag-initiating event of a user interface element corresponding to an object on a second device has been received by a mirroring application of a first device;
    causing, based on the receiving the indication of the drag-initiating event, the object to be saved to a temporary storage location of the second device;
    receiving an indication that a drag input of the user interface element corresponding to the object has been received by the minoring application of the first device;
    copying the object;
    receiving an indication that, during the drag input, the user interface element corresponding to the object has crossed a boundary separating the minoring application on the first device and a native construct on the user interface of the first device; and
    causing, based on receiving the indication that the user interface element corresponding to the object has crossed the boundary, the object to be saved to a temporary storage location of the first device.

9. The computer-implemented method of claim 8, further comprising:
    establishing a wireless connection between the first device and the second device.

10. The computer-implemented method of claim 8, wherein the native construct is an application, and wherein the computer-implemented method further comprises:
    identifying a type of the application; and
    determining whether the object is compatible with the application type.

11. The computer-implemented method of claim 10, further comprising:
    determining that the object is not compatible with the application type; and
    translating the object into a format that is compatible with the application type.

12. A system for assisting with cross-platform drag and drop functionality, the system comprising:
    a memory for storing executable program code; and
    a processor, functionally coupled to the memory, the processor being responsive to computer-executable instructions contained in the program code and operative to:
        surface, on a user interface of a first device connected to a second device, a mirroring application that mirrors a user interface of the second device and partially overlaps the user interface of the first device;
        receive a drag-initiating input of a user interface element corresponding to an object of the second device;
        save, based on receiving the drag-initiating input, the object to a temporary storage location of the second device;

receive a drag input dragging the user interface element corresponding to the object over a boundary of the mirroring application;

surface a second user interface element corresponding to the object at a location of the user interface of the first device corresponding to a location where the drag input crossed the boundary of the minoring application;

save, based on the drag input crossing the boundary of the mirroring application, the object to a temporary storage location of the first device;

receive a drop input of the user interface element on a construct displayed on the user interface of the first device;

translate the object to a format compatible with the construct; and save the object to a location of the first device corresponding to the construct.

13. The system of claim 12, wherein the user interface of the second device is in an off state when it is mirrored by the minoring application.

14. The system of claim 12, wherein the first device operates on a first platform, and the second device operates on a second platform.

15. The system of claim 12, wherein the drag-initiating input is initially received at the mirroring application.

16. The system of claim 12, wherein the second device is in an on state when it is mirrored by the minoring application, and the drag-initiating input is initially received at the second device.

* * * * *